(12) United States Patent
Morikawa et al.

(10) Patent No.: US 12,731,779 B2
(45) Date of Patent: Sep. 8, 2026

(54) NEGATIVE ELECTRODE AND NONAQUEOUS ELECTROLYTE SECONDARY BATTERY INCLUDING THE SAME

(71) Applicant: Prime Planet Energy & Solutions, Inc., Tokyo (JP)

(72) Inventors: Yuki Morikawa, Kobe (JP); Akira Tsujiko, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 1123 days.

(21) Appl. No.: 17/838,263

(22) Filed: Jun. 13, 2022

(65) Prior Publication Data

US 2022/0399535 A1 Dec. 15, 2022

(30) Foreign Application Priority Data

Jun. 15, 2021 (JP) ................................ 2021-099229

(51) Int. Cl.
*H01M 4/134* (2010.01)
*H01M 4/02* (2006.01)
*H01M 4/36* (2006.01)

(52) U.S. Cl.
CPC .......... *H01M 4/134* (2013.01); *H01M 4/362* (2013.01); *H01M 2004/027* (2013.01)

(58) Field of Classification Search
CPC . H01M 4/134; H01M 4/362; H01M 2004/027
See application file for complete search history.

(56) References Cited

U.S. PATENT DOCUMENTS

2007/0202408 A1 8/2007 Nakanishi et al.
2016/0204428 A1 7/2016 Sugawara
2016/0285081 A1 9/2016 Matsuno et al.
(Continued)

FOREIGN PATENT DOCUMENTS

CN 110323485 A 10/2019
JP 2015-18663 A 1/2015
(Continued)

OTHER PUBLICATIONS

Office Action in CN Application No. 202210668285.0 mailed Mar. 20, 2025, 15 pp.

*Primary Examiner* — Armindo Carvalho, Jr.
(74) *Attorney, Agent, or Firm* — HAUPTMAN HAM, LLP

(57) ABSTRACT

The negative electrode disclosed herein includes: a negative electrode current collector; and a negative electrode active material layer formed on the surface of the negative electrode current collector. The negative electrode active material layer contains silicon oxide containing at least one alkali earth metal. The negative electrode active material layer includes at least a first layer and a second layer. The first layer is disposed between the second layer and the negative electrode current collector. The second layer contains 2 mass % or less of the silicon oxide containing the alkali earth metal, relative to 100 mass % of the negative electrode active material in the second layer. The amount of the alkali earth metal in the first layer calculated based on energy dispersive X-ray spectroscopy using a scanning electron microscope image is higher than the amount of the alkali earth metal in the second layer.

12 Claims, 2 Drawing Sheets

(56) References Cited

U.S. PATENT DOCUMENTS

| | | | | |
|---|---|---|---|---|
| 2018/0269475 | A1 | 9/2018 | Oh et al. | |
| 2018/0301708 | A1 | 10/2018 | Torita et al. | |
| 2019/0305375 | A1 * | 10/2019 | Uehara | H01M 10/0569 |
| 2020/0274147 | A1 * | 8/2020 | Lee | H01M 4/625 |

FOREIGN PATENT DOCUMENTS

| | | | |
|---|---|---|---|
| JP | 2015-179575 | A | 10/2015 |
| JP | 2015-232921 | A | 12/2015 |
| JP | 2016-181331 | A | 10/2016 |
| JP | 2017091942 | A | 5/2017 |
| JP | 2018-156922 | A | 10/2018 |
| TW | 200713670 | A | 4/2007 |
| WO | 2020059145 | A1 | 3/2020 |

* cited by examiner

NEGATIVE ELECTRODE AND NONAQUEOUS ELECTROLYTE SECONDARY BATTERY INCLUDING THE SAME

CROSS REFERENCE TO RELATED APPLICATIONS

The present application is based upon and claims the benefit of priority from Japanese patent application No. 2021-099229 filed on Jun. 15, 2021, and the entire disclosure of which is incorporated herein in its entirety by reference.

BACKGROUND

The present disclosure relates to a negative electrode. The present disclosure further relates to a nonaqueous electrolyte secondary battery including the negative electrode.

In recent years, nonaqueous electrolyte secondary batteries such as lithium ion secondary batteries have been suitably used as portable power sources for personal computers, mobile terminals, and the like, and power sources for driving vehicles such as electric vehicles (BEV), hybrid vehicles (HEV), and plug-in hybrid vehicles (PHEV).

The negative electrode of a nonaqueous electrolyte secondary battery is generally configured such that the negative electrode active material layer containing a negative electrode active material is supported on the negative electrode current collector. In recent years, in order to increase the capacity of the negative electrode, it has been considered to use a silicon (Si)-based negative electrode active material such as silicon and a silicon compound, which can store and release chemical species (e.g., lithium ions) to be charge carriers. Further, the following is known. The Si-based negative electrode active material described above has a high theoretical capacity, but has a large expansion and contraction (volume change) of the negative electrode active material with a charge-discharge cycle. Thus, the capacity retention rate greatly decreases after the charge-discharge cycle.

Japanese Patent Application Publication No. 2018-156922 discloses a silicon composite oxide for use in the negative electrode material, containing a $MgSiO_3$ crystal and having its surface coated with a carbon substance, and a negative electrode using the oxide, in order to improve charge and discharge capacity and initial charge and discharge efficiency of the secondary battery, and capacity retention rate.

SUMMARY

However, as a result of earnest studies, the present inventors found that the negative electrode using only the silicon composite oxide for use in the negative electrode material, containing a $MgSiO_3$ crystal and having its surface coated with a carbon substance achieves improvement in the capacity retention rate (cycle life) after cycles of the secondary battery, but the initial resistance of the secondary battery is high, and there is still room for improvement in terms of an increase in the output.

The present disclosure was made in view of the circumstances described above, and main objective of the present disclosure is to provide a negative electrode which achieves both improvement in the cycle life and an increase in output of the secondary battery. Another objective of the present disclosure is to provide a nonaqueous electrolyte secondary battery including the negative electrode.

A negative electrode disclosed herein includes: a negative electrode current collector; and a negative electrode active material layer formed on a surface of the negative electrode current collector. The negative electrode active material layer contains silicon oxide containing at least one alkali earth metal. The negative electrode active material layer includes at least a first layer and a second layer, The first layer is disposed between the second layer and the negative electrode current collector. The second layer contains 2 mass % or less of the silicon oxide containing the alkali earth metal, relative to 100 mass % of the negative electrode active material in the second layer. An amount of the alkali earth metal in the first layer calculated based on energy dispersive X-ray spectroscopy using a scanning electron microscope image is higher than an amount of the alkali earth metal in the second layer.

In this configuration, the alkali earth metal is unevenly distributed in the first layer, and the mass proportion of the silicon oxide containing an alkali earth metal in the second layer is limited. This allows the entire negative electrode active material layer to contribute effectively to a charging and discharging reaction. Accordingly, a negative electrode which achieves both improvement in the cycle life and an increase in the output of the secondary battery can be provided.

In one aspect of the negative electrode disclosed herein, the first layer contains 2 mass % or more of the silicon oxide containing the alkali earth metal, relative to 100 mass % of the negative electrode active material in the first layer. This configuration allows a negative electrode which achieves improvement in the cycle life of the secondary battery more suitably to be provided.

In one aspect of the negative electrode disclosed herein, a ratio of an average thickness of the first layer to an average thickness of the negative electrode active material layer is 20% or more and 70% or less. This configuration allows a negative electrode which achieves both improvement in the cycle life and an increase in the output of the secondary battery at higher level to be provided.

In one aspect of the negative electrode disclosed herein, the silicon oxide containing the alkali earth metal includes silicon oxide containing magnesium and/or silicon oxide containing calcium. This configuration allows a negative electrode which achieves both improvement in the cycle life and an increase in the output of the secondary battery at higher level to be provided.

In one aspect of the negative electrode disclosed herein, the second layer contains silicon oxide containing an alkali metal. This configuration allows a negative electrode which achieves an increase in the output of the secondary battery more suitably to be provided.

In one aspect of the negative electrode disclosed herein, the first layer contains silicon oxide containing an alkali metal. This configuration allows a negative electrode which achieves an increase in the output of the secondary battery more suitably to be provided.

In one aspect of the negative electrode disclosed herein, the silicon oxide containing the alkali metal includes silicon oxide containing lithium. This configuration improves dispersibility of Li ions, and achieves an increase in output of the secondary battery more suitably.

In one aspect of the negative electrode disclosed herein, the negative electrode active material layer contains a carbon material. This configuration allows a negative electrode which achieves both improvement in the cycle life and an increase in the output of the secondary battery at higher level to be provided.

In another aspect, the nonaqueous electrolyte secondary battery disclosed herein includes the negative electrode, a positive electrode, and a nonaqueous electrolyte. This configuration allows a nonaqueous electrolyte secondary battery having excellent cycle life and output characteristics to be provided.

DETAILED DESCRIPTION

Figures 1, 2:
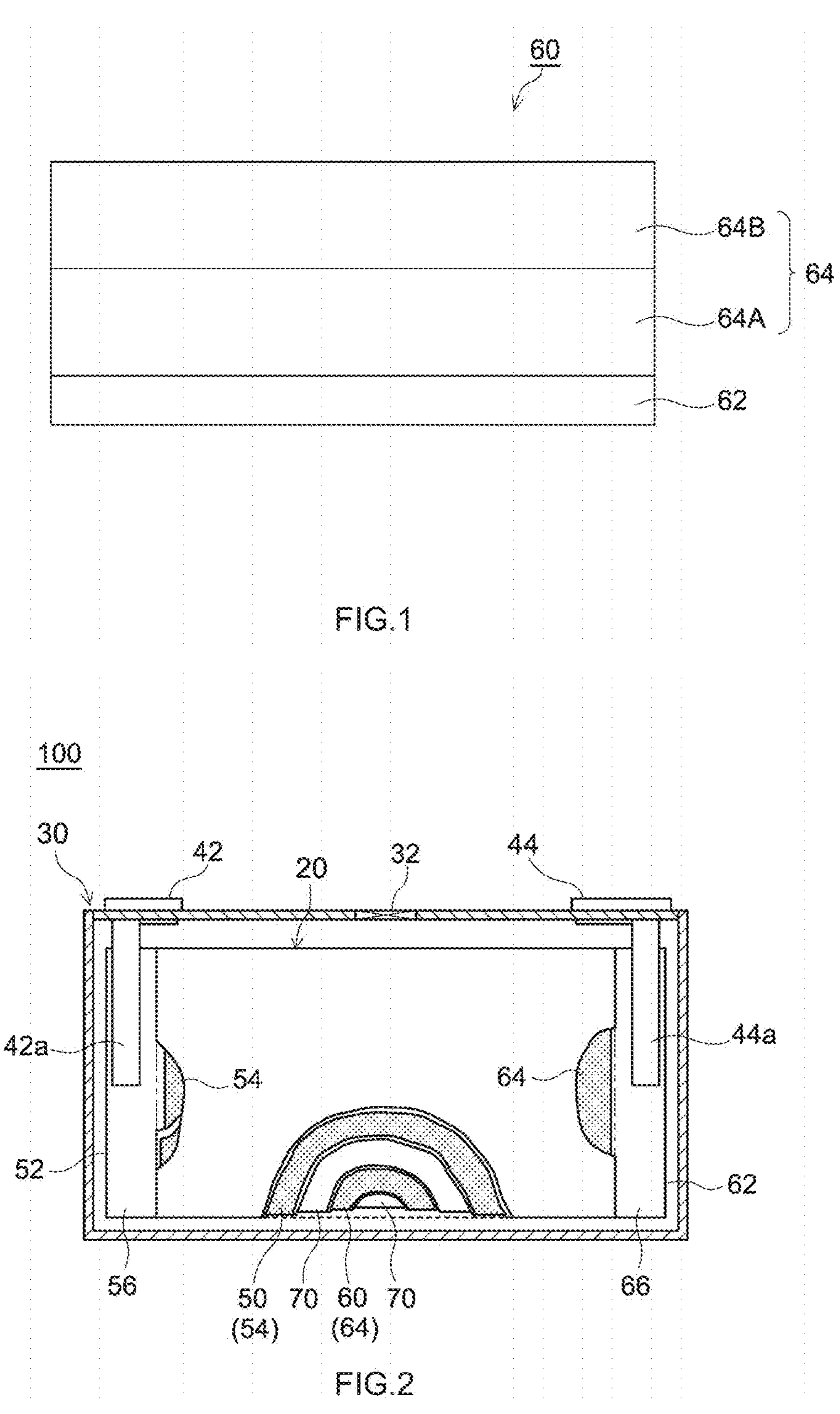
FIG. 1 is a schematic drawing of a structure of a negative electrode according to an embodiment.
FIG. 2 is a schematic view of a sectional structure of a lithium ion secondary battery according to an embodiment.

An embodiment of the present disclosure will be described below with reference to the accompanying drawings. The matters necessary for executing the present disclosure, which are not mentioned herein, can be grasped as design matters of those skilled in the art based on the related art in the preset field. The present disclosure can be executed based on the contents disclosed herein and the technical knowledge in the present field. In the following drawings, the same members/portions which exhibit the same action are denoted by the same reference numeral. The dimensional relation (such as length, width, or thickness) in each drawing does not reflect the actual dimensional relation.

The "secondary battery" herein indicates an electricity storage device that can be repeatedly charged and discharged, and encompasses so-called secondary batteries and electricity storage elements such as electric double-layer capacitors. The "lithium ion secondary battery" herein indicates a secondary battery which uses lithium ions as electric charge carriers and achieves charging and discharging by movement of electric charges associated with the lithium ions between positive and negative electrodes.

FIG. 1 schematically illustrates the negative electrode disclosed herein. The negative electrode 60 includes, as shown in FIG. 1, a negative electrode current collector 62 and a negative electrode active material layer 64 supported on the negative electrode current collector 62. In the example shown in FIG. 1, the negative electrode active material layer 64 is provided on one surface of the negative electrode current collector 62, but may be provided on each of both surfaces of the negative electrode current collector 62. The negative electrode active material layer 64 is provided preferably on each of both surfaces of the negative electrode current collector 62.

As the negative electrode current collector 62, a sheet or a foil-like body made of a metal such as copper, nickel, titanium, and stainless steel can be used, and a copper foil is suitably used. If a copper foil is used as the negative electrode current collector 62, the thickness thereof is, for example, 5 μm or more and 35 μm or less, preferably 7 μm or more and 20 μm or less although not particularly limited thereto.

As shown in FIG. 1, the negative electrode active material layer 64 at least includes a first layer MA and a second layer 64B. The first layer 64A is formed between the second layer 64B and the negative electrode current collector 62. Specifically, the first layer MA is positioned on the negative electrode current collector 62 side, and the second layer 64B is positioned on the surface layer side of the negative electrode active material layer 64. The first layer 64A is typically formed on the surface of the negative electrode current collector 62. The negative electrode active material layer 64 may have a multilayer structure of at least two layers, and may have a multilayer structure of three or more layers.

The negative electrode active material layer 64 contains silicon oxide containing at least one type of alkali earth metal as a negative electrode active material. In the negative electrode 60 disclosed here, the amount of the alkali earth metal in the first layer MA calculated based on energy dispersive X-ray spectroscopy using a scanning electron microscope image is higher than the amount of the alkali earth metal in the second layer 64B.

The "amount (mass %) of the alkali earth metal" herein can be determined by energy dispersive X-ray spectroscopy (SEM-EDS) using a scanning electron microscope. Specifically, first, a SEM image of the cross section of the negative electrode active material layer along its thickness direction is captured. Then, the SEM image is subjected to EDS to calculate the proportion (mass %) of each constitutional element contained in the negative electrode active material layer. The proportion of the alkali earth metal element (such as Mg and Ca) calculated (i.e., the proportion of the alkali earth metal element relative to all constitutional elements in the negative electrode active material layer) is referred to as the "amount (mass %) of the alkali earth metal" herein.

The amount (mass %) of the alkali earth metal in each of the first layer and the second layer can be calculated as follows, for example. Assume that in the cross section of the negative electrode active material layer along its thickness direction, 20% of the thickness from the current collector toward the internal direction of the active material layer is set as the first layer, and 20% of the thickness from the surface layer toward the internal direction of the active material layer is set as the second layer. Then, in the same manner as described above, the first layer and the second layer are subjected to EDS, and the proportion (mass %) of each constitutional element in each of the first layer and the second layer is calculated. The proportion of the alkali earth metal element in all constitutional elements in the first layer is referred to as "the amount (mass %) of the alkali earth metal in the first layer" herein, and the proportion of the alkali earth metal element in all constituent elements in the second layer is referred to as "the amount of the alkali earth metal in the second layer" herein.

The amount of the alkali earth metal in the first layer MA is preferably 0.5 mass % or more and 10 mass % or less, more preferably 1 mass % or more and 8 mass % or less. The amount of the alkali earth metal in the second layer 64B may be less than 2 mass %, or 1 mass % or less. Typically, a region containing 0.5 mass % or more alkali earth metal calculated by SEM-EDS is set as the first layer 64A. The amount of the alkali earth metal in the second layer 64B does not limit the technology disclosed herein. In other words, the amount of the alkali earth metal in the second layer 64B may be 0 mass %.

The average thickness of the negative electrode active material layer 64 is, for example, 10 μm or more and 300 μm or less, preferably 20 μm or more and 200 μm or less. In one aspect, a ratio of the average thickness of the first layer MA to the average thickness of the negative electrode active material layer 64 is preferably 15% or more and 75% or less, more preferably 20% or more and 70% or less.

The negative electrode active material layer 64 at least contains a negative electrode active material which can reversibly store and release chemical species that serve as charge carriers (lithium ions in the lithium ion secondary battery). In the technology disclosed herein, the negative electrode active material layer 64 contains silicon oxide containing at least one alkali earth metal as a negative electrode active material. The silicon oxide containing an alkali earth metal is typically in the state where silicon oxide ($SiO_y$) containing silicon (Si) and oxygen (O) as a necessary component is doped with the alkali earth metal (such as Mg and Ca). For example, the silicon oxide preferably has composition represented by the general formula: $M_xSiO_y$ (where x and y satisfy $0<x\leq0.25$ and $0<y\leq2$, respectively. M is at least one element selected from the group consisting of Mg, Ca, Be, Sr, Ba, and Ra). Among them, the silicon oxide containing an alkali earth metal is preferably silicon oxide containing Mg and/or silicon oxide containing Ca.

The mean particle diameter (median diameter D50) of the silicon oxide containing an alkali earth metal is, although not particularly limited thereto, for example, 0.5 μm or more and 15 μm or less. The "mean particle diameter (median diameter D50)" herein is a particle diameter corresponding to the particle diameter at a cumulative value of 50% of fine particle side in the volume-based particle size distribution based on commonly used laser diffraction/scattering method.

The silicon oxide containing Mg is typically a compound of Mg—Si—O, which is silicon oxide ($SiO_y$) doped with Mg as an alkali earth metal. When $SiO_y$ is doped with Mg, a Si phase, a $SiO_y$ phase, or a $MgSiO_3$ phase may be generated as a crystal structure. The silicon oxide containing Mg typically has a $MgSiO_3$ phase. In the technology disclosed herein, the silicon oxide containing Mg preferably has composition represented by the general formula: $Mg_\alpha SiO_y$ (where $\alpha$ and y satisfy $0<\alpha\leq0.25$ and $0<y\leq2$ respectively).

Similarly, the silicon oxide containing Ca is typically a compound of Ca—Si—O, which is silicon oxide ($SiO_y$) doped with Ca as an alkali earth metal. In the technology disclosed herein, the silicon oxide containing Ca preferably has composition represented by the general formula: $Ca_\beta SiO_y$ (where $\beta$ and y satisfy $0<\beta\leq0.25$ and $0<y\leq2$ respectively).

The first layer 64A contains silicon oxide containing at least one alkali earth metal as a negative electrode active material. The mass proportion of the silicon oxide containing the alkali earth metal in the first layer 64A is preferably 1 mass % or more and 20 mass % or less, more preferably 1.5 mass % or more and 20 mass % or less, particularly preferably 2 mass % or more and 20 mass % or less, relative to 100 mass % of the negative electrode active material in the first layer MA. The mass proportion of the silicon oxide containing the alkali earth metal in the second layer 64B is preferably less than 3 mass %, more preferably 2 mass % or less, particularly preferably 1 mass % or less, relative to 100 mass % of the negative electrode active material in the second layer MB. Whether the second layer 64B contains silicon oxide containing an alkali earth metal does not limit the technology disclosed herein. That is, the mass proportion of the silicon oxide containing the alkali earth metal in the second layer 64B may be 0 mass %.

The mass proportion of the silicon oxide containing the alkali earth metal in each layer can be determined by setting the first and second layers as mentioned above and subjecting the first and second layers to ICP spectroscopy, for example.

By adjusting the mass proportions of the silicon oxide containing the alkali earth metal in the first layer MA and the second layer MB to be in the above-mentioned ranges, improvement in the cycle life and an increase in the output of the secondary battery can be achieved suitably. The reason for this is not particularly limited, but can be assumed as follows.

When the silicon oxide contains an alkali earth metal by doping or the like, chemical species which serve as charge carriers (lithium ions in the lithium ion secondary battery) tend to be dispersed slowly. When the second layer contains a large amount of silicon oxide containing an alkali earth metal, the output of the secondary battery in a short time decreases. In contrast, in the technology disclosed herein, the amount of the silicon oxide containing an alkali earth metal in the second layer disposed on the surface layer side of the negative electrode active material layer is limited. This allows prevention of the increase in the resistance. Accordingly, the decrease in the output of the secondary battery in short time can be substantially prevented. When the silicon oxide containing an alkali earth metal is unevenly distributed in the first layer disposed on the current collector side, ions entering from the surface layer side are also dispersed on the current collector side in long-time use, which causes the entire negative electrode active material layer to contribute to the charging and discharging reaction. This can improve the cycle life. When the mass proportion of the silicon oxide containing an alkali earth metal is adjusted suitably in the negative electrode active material layer, increase in the output and the improvement in the cycle life of the secondary battery can be both achieved.

The negative electrode active material layer 64 may contain silicon oxide containing at least one alkali metal as a negative electrode active material. The silicon oxide containing an alkali metal is typically in the state where silicon oxide ($SiO_y$) containing silicon (Si) and oxygen (O) as necessary components is doped with the alkali metal (such as Li and Na). For example, the silicon oxide containing an alkali metal preferably has composition represented by the general formula: $Q_\gamma SiO_y$ (where $\gamma$ and y satisfy $0<\gamma\leq2$ and $0<y\leq2$, respectively. Q is at least one element selected from the group consisting of Li, Na, Km Rb, Cs, and Fr). Among them, the silicon oxide containing an alkali metal is preferably silicon oxide containing Li.

The second layer 64B may contain silicon oxide containing an alkali metal. The mass proportion of the silicon oxide containing the alkali metal in the second layer 64B may be 20 mass % or less, or 18 mass % or less, relative to 100 mass % of the negative electrode active material in the second layer 64B. The first layer MA may contain silicon oxide containing an alkali metal. The mass proportion of the silicon oxide containing the alkali metal in the first layer 64A may be 18 mass % or less, or 16 mass % or less, relative to 100 mass % of the negative electrode active material in the first layer 64A. In the technology disclosed herein, the mass proportion of the silicon oxide containing the alkali metal in the negative electrode active material layer 64 does not limit the technology disclosed herein. That is, the mass proportion of the silicon oxide containing the alkali metal in the negative electrode active material layer 64 may be 0 mass %.

The mass proportion of the silicon oxide containing the alkali metal in each layer can be determined by subjecting the layer to ICP spectroscopy as mentioned above, for example.

The silicon oxide containing the alkali earth metal and the silicon oxide containing the alkali metal can be produced by the following method, for example. A powder of $SiO_y$, a raw material powder of the alkali earth metal (e.g., Mg or Ca), and a raw material powder of the alkali metal (e.g., Li or Na) are provided. The raw material powder of the alkali earth metal may be, for example, a Mg powder or a Ca powder. The raw material powder of the alkali metal may be, for example, a LiH powder. The powder of $SiO_y$ and the raw material powder of the alkali earth metal or the alkali metal are mixed using a ball mill or the like to obtain a powder mixture. The powder mixture is heated at about 1000° C. for about 1 hour in an argon (Ar) atmosphere. Thus, $SiO_y$ is doped with the alkali earth metal or the alkali metal.

The negative electrode active material layer 64 further contains, as a negative electrode active material, a carbon material such as graphite, hard carbon, and soft carbon in addition to the silicon oxide containing an alkali earth metal. The graphite may be natural graphite, artificial graphite, or amorphous carbon-coated graphite where graphite is coated with an amorphous carbon material.

Properties (e.g., the average particle diameter and the BET specific surface area) of the carbon material are not particularly limited. The carbon material is typically granule. The mean particle diameter D50 of the particulate carbon material may be 1 μm or more and 20 μm or less, or 5 μm or more and 15 μm or less. The carbon material having a BET specific surface area measured by the BET method, for example 0.5 $cm^2/g$ or more and 3 $cm^2/g$ or less can be preferably employed.

The negative electrode active material layer 64 may contain another negative electrode active material within a range which does not inhibit the effect of the technology disclosed therein, in addition to the materials described above. The other negative electrode active material can be, for example, a Si-based negative electrode active material. Examples of the Si-based negative electrode active material include an elemental metal of Si, an oxide (e.g., $SiO_y$) of Si as a constitutional element, and an alloy of Si as a constitutional element.

Although not particularly limited thereto, the content of the negative electrode active material in the negative electrode active material layer 64 (i.e., the proportion of the negative electrode active material in the total mass of the negative electrode active material layer) may be 80 mass % or more and 99 mass % or less, or 85 mass % or more and 98 mass % or less. The mass proportion of the Si-based negative electrode active material (including silicon oxide containing an alkali earth metal and silicon oxide containing an alkali metal) is preferably 2 mass % or more and 20 mass % or less, more preferably 3 mass % or more and 18 mass % or less, particularly preferably 4 mass % or more and 16 mass % or less, relative to 100 mass % of the negative electrode active material in the negative electrode active material layer 64. The mass proportion of the carbon material is preferably 80 mass % or more and 98 mass % or less, more preferably 82 mass % or more and 97 mass % or less, particularly preferably 84 mass % or more and 96 mass % or less, relative to 100 mass % of the negative electrode active material in the negative electrode active material layer 64.

Although not particularly limited thereto, the content of the negative electrode active material in the first layer 64A may be 80 mass % or more and 99 mass % or less, or 85 mass % or more and 98 mass % or less. The mass proportion of the Si-based negative electrode active material (including silicon oxide containing an alkali earth metal and silicon oxide containing an alkali metal) is preferably 2 mass % or more and 25 mass % or less, more preferably 5 mass % or more and 20 mass % or less, particularly preferably 10 mass % or more and 20 mass % or less, relative to 100 mass % of the negative electrode active material in the first layer 64A. The mass proportion of the carbon material is preferably 75 mass % or more and 98 mass % or less, more preferably 80 mass % or more and 95 mass % or less, particularly preferably 80 mass % or more and 90 mass % or less, relative to 100 mass % of the negative electrode active material in the first layer 64A.

Although not particularly limited thereto, the content of the negative electrode active material in the second layer MB may be 80 mass % or more and 99 mass % or less, or 85 mass % or more and 98 mass % or less. The mass proportion of the Si-based negative electrode active material (including silicon oxide containing an alkali earth metal and silicon oxide containing an alkali metal) is preferably 2 mass % or more and 25 mass % or less, more preferably 10 mass % or more and 20 mass % or less, relative to 100 mass % of the negative electrode active material in the second layer 64B. The mass proportion of the carbon material is preferably 75 mass % or more and 98 mass % or less, more preferably 80 mass % or more and 90 mass % or less, relative to 100 mass % of the negative electrode active material in the second layer 64B.

The negative electrode active material layer 64 may further contain, for example, a component other than the negative electrode active material, such as a binder and a thickener. As the binder, a styrene-butadiene rubber (SBR) and a modified product thereof, acrylonitrile butadiene rubber and a modified product thereof, an acrylic rubber and a modified product thereof, and a fluorine rubber may be used, for example. Among them, the binder is preferably SBR. The content of the binder in the negative electrode active material layer 64 is preferably 0.1 mass % or more and 8 mass % or less, more preferably 0.2 mas % or more and 3 mass % or less although not particularly limited thereto.

Examples of the thickener used include: cellulose-based polymers such as carboxymethyl cellulose (CMC), methyl cellulose (MC), cellulose acetate phthalate (CAP), and hydroxypropyl methylcellulose (HPMC); and polyvinyl alcohol (PVA). Among them, the thickener is preferably CMC. The content of the thickener in the negative electrode active material layer 64 is preferably 0.3 mass % or more and 3 mass % or less, more preferably 0.4 mas % or more and 2 mass % or less although not particularly limited thereto.

The negative electrode configured as described above achieves both improvement in the cycle life and an increase in the output. The negative electrode configured as described above can be used as a negative electrode for a secondary battery in accordance with a known method. Thus, the negative electrode disclosed herein is suitably for use in a secondary battery. The secondary battery is suitably a nonaqueous electrolyte secondary battery.

<Nonaqueous Electrolyte Secondary Battery>

In another aspect, the nonaqueous electrolyte secondary battery disclosed herein includes the negative electrode, a positive electrode, and a nonaqueous electrolyte.

An embodiment of the nonaqueous electrolyte secondary battery disclosed herein will be described in detail below with reference to a flat square lithium ion secondary battery including a flat wound electrode assembly and a flat battery case as an example. However, this is not intended to limit the nonaqueous electrolyte secondary battery disclosed herein to the one described in the embodiment.

The lithium ion secondary battery 100 shown in FIG. 2 is a sealed battery constructed by housing a flat wound electrode assembly 20 and a nonaqueous electrolyte (not shown) in a flat square battery case (i.e., an outer container) 30. The battery case 30 includes a positive electrode terminal 42 and a negative electrode terminal 44 for external connection, and a thin-walled safety valve 32 set to release an internal pressure of the battery case 30 when the internal pressure increases to a predetermined level or higher. The battery case 30 is provided with an inlet (not shown) for introducing the nonaqueous electrolyte. The positive electrode terminal 42 is electrically connected to a positive electrode current collector 42*a*. The negative electrode terminal 44 is electrically connected to a negative electrode current collector 44*a*. As the material of the battery case 30, a metal material which is light and has high thermal conductivity, such as aluminum can be used, for example.

Figure 3:
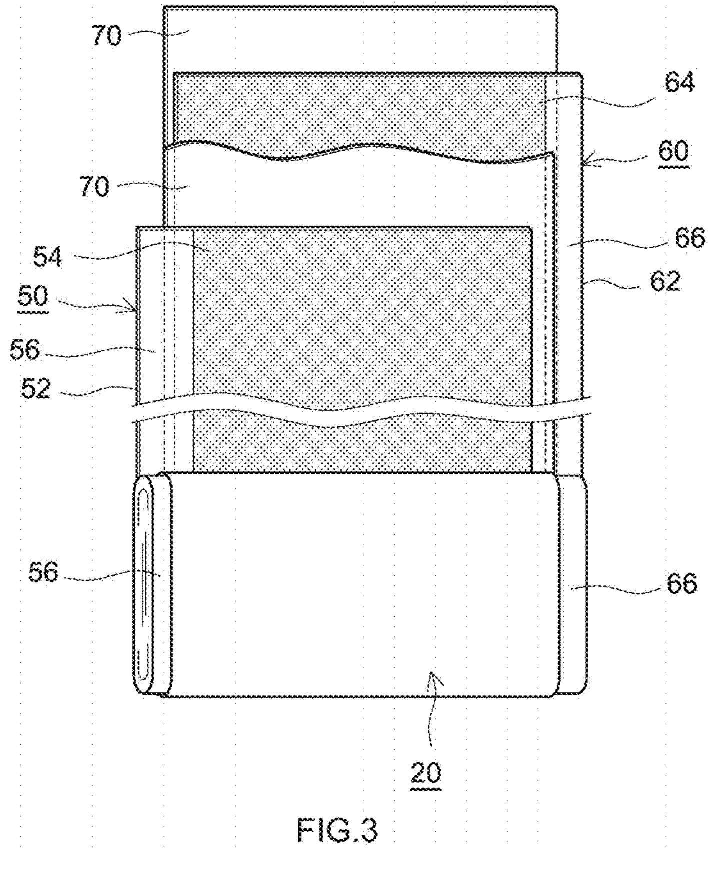
FIG. 3 is a schematic view of a configuration of a wound electrode assembly of a lithium ion secondary battery according to an embodiment.

As shown in FIGS. 2 and 3, the wound electrode assembly 20 has a form in which a positive electrode sheet 50 and a negative electrode sheet 60 are overlaid on each other via two long separators 70 and are wound in the longitudinal direction. The positive electrode sheet 50 has a configuration where a positive electrode active material layer 54 is formed on one or both surfaces (here, on both surfaces) of a long positive electrode current collector 52 along the longitudinal direction. The negative electrode sheet 60 has a configuration where a negative electrode active material layer 64 is formed on one or both surfaces (here, on both surfaces) of a long negative electrode current collector 62 along the longitudinal direction. A positive electrode active material layer non-formation portion 56 (i.e., exposed portion of the positive electrode collector 52 at which the positive electrode active material layer 54 is not formed) and a negative electrode active material layer non-formation portion 66 (i.e. exposed portion of the negative electrode collector 62 at which the negative electrode active material layer 64 is not formed) are formed so as to extend off outwardly from both ends in the winding axial direction (i.e., the sheet width direction orthogonal to the longitudinal direction) of the wound electrode body 20, respectively. The positive electrode active material layer non-formation portion 56 and the negative electrode active material layer non-formation portion 66 are joined to a positive electrode current collector 42*a* and a negative electrode current collector 44*a*, respectively.

As the negative electrode sheet 60, the above-mentioned negative electrode is used.

As the positive electrode current collector 52 forming the positive electrode sheet 50, a sheet or a foil-like body made of a metal such as aluminum, nickel, titanium, and stainless steel can be used, and an aluminum foil is suitably used. If an aluminum foil is used as the positive electrode current collector 52, the thickness thereof is, for example, 5 μm or more and 35 μm or less, preferably 7 μm or more and 20 μm or less, although not particularly limited thereto.

The positive electrode active material contained in the positive electrode active material layer 54 is not particularly limited, and one kind, or two or more kinds of commonly used positive electrode active materials for nonaqueous electrolyte secondary batteries, particularly lithium ion secondary batteries can be used. The positive electrode active material used can be preferably, for example, a lithium composite oxide, or a lithium transition metal phosphate compound (e.g., $LiFePO_4$). Examples of the lithium composite oxide include a lithium nickel-based composite oxide, lithium cobalt-based composite oxide, a lithium manganese-based composite oxide, a lithium nickel manganese-based composite oxide (e.g., $LiNi_{0.5}Mn_{1.5}O_4$), and a lithium nickel manganese cobalt-based composite oxide (e.g., $LiNi_{1/3}Co_{1/3}Mn_{1/3}O_2$).

The mean particle diameter of the positive electrode active material is approximately 0.5 μm or more and 50 μm or less, for example 1 μm or more and 20 μm or less although not particularly limited thereto.

The positive electrode active material layer 54 may further contain, for example, an electroconductive material, a binder, and the like besides the positive electrode active material. The electroconductive material used can be, for example, preferably carbon black such as acetylene black (AB) and other carbon materials (such as graphite). The binder used can be, for example, preferably fluorine-based binders such as polyvinylidene fluoride (PVdF) and polytetrafluoroethylene (PTFE) and rubber-based binders such as styrene-butadiene rubber (SBR). The positive electrode active material layer 54 may further contain, for example, materials (e.g., various additives) in addition to the above-mentioned materials as long as it does not impair the effect of the present disclosure.

In light of the energy density, the content of the positive electrode active material in the positive electrode active material layer 54 (i.e., the proportion of the positive electrode active material in the total mass of the positive electrode active material layer) is preferably approximately 70 mass % or more. The content of the positive electrode active material is, for example, more preferably 75 mass % or more and 99 mass % or less, yet more preferably 80 mass % or more and 97 mass % or less. The content of the electroconductive material in the positive electrode active material layer 54 is, for example, preferably 0.1 mass % or more and 20 mass % or less, more preferably 1 mass % or more and 15 mass % or less. The content of the binder in the positive electrode active material layer 54 is, for example, preferably 0.5 mass % or more and 15 mass % or less, more preferably 1 mass % or more and 10 mass % or less. If the positive electrode active material layer 54 contains various additives such as a thickener, the content of the additives in the positive electrode active material layer 54 is, for example, preferably 7 mass % or less, more preferably 5 mass % or less.

Examples of the separator 70 include porous sheets (films) made of resin such as polyethylene (PE), polypropylene (PP), polyester, cellulose, and polyamide. Such a porous sheet may have a monolayer structure, or a lamination structure of two or more layers (e.g., a three-layer structure where PP layers are stacked on both surfaces of a PE layer). The surface of the separator 70 may be provided with a heat-resistant layer (HRL).

Although not particularly limited thereto, the thickness of the separator 70 is, for example, 5 μm or more and 50 μm or less, preferably 10 μm or more and 30 μm or less.

The nonaqueous electrolyte used is typically a liquid (nonaqueous electrolyte) obtained by dissolving or dispersing an electrolyte salt (in other words, a supporting electrolyte) in a nonaqueous solvent. Alternatively, the nonaqueous electrolyte may be a solid (typically a so-called gel) obtained by adding a polymer to the nonaqueous electrolyte. The nonaqueous solvent used can be any of organic solvents such as various carbonates, ethers, esters, nitriles, sulfones, and lactones, which are used in an electrolyte of commonly used lithium ion secondary batteries, without particular limitations. Among them, the nonaqueous solvent used is preferably carbonates, and specific examples thereof include ethylene carbonate (EC), propylene carbonate (PC), diethyl carbonate (DEC), dimethyl carbonate (DMC), ethyl methyl carbonate (EMC), monofluoro ethylene carbonate (MFEC), difluoro ethylene carbonate (DFEC), monofluoromethyl difluoromethyl carbonate (F-DMC), and trifluorodimethyl carbonate (TFDMC). These nonaqueous solvents may be used alone or in combination of two or more of them, as appropriate.

The electrolyte salt used can be, for example, a lithium salt such as $LiPF_6$, $LiBF_4$, or lithium bis(fluorosulfonyl) imide (LiFSI), and is preferably $LiPF_6$ among them. The concentration of the electrolyte salt is not particularly limited, and is preferably 0.7 mol/L or more and 1.3 mol/L or less. The nonaqueous electrolyte may further contain, for example, various additives such as a film-forming agent, namely an oxalato complex; gas generating agent, namely biphenyl (BP) and cyclohexyl benzene (CHB); and a thickener, in addition to the components mentioned above, as long as the effect of the present disclosure is not significantly impaired.

The lithium ion secondary battery 100 configured as described above achieves both improvement in the cycle life and an increase in the output. The lithium ion secondary battery 100 can be used for various applications. Suitable applications include power sources for driving, to be mounted on vehicles such as electric vehicles (BEV), hybrid vehicles (HEV), and plug-in hybrid vehicles (PHEV). Among them, a secondary battery for hybrid vehicles (HEV) is used in combination with an engine (internal combustion engine), and is, for example, required to achieve high output in short time. Thus, the negative electrode and the nonaqueous electrolyte secondary battery including the negative electrode disclosed herein are applied thereto more suitably. Typically, the multiple lithium ion secondary batteries 100 used may be connected in series and/or parallel to be in an assembled battery.

The square lithium ion secondary battery 100 including the flat wound electrode assembly 20 has been described above as an example. However, the lithium ion secondary battery disclosed herein can be configured as a lithium ion secondary battery including a laminated electrode assembly (i.e., an electrode assembly where multiple positive electrodes and multiple negative electrodes are stacked alternately). The nonaqueous electrolyte secondary battery disclosed herein may also be configured as a cylindrical lithium ion secondary battery, a laminate case type lithium ion secondary battery, or coin type lithium ion secondary battery, for example.

In accordance with a known method, the negative electrode may be used to construct an all-solid-state battery including a solid electrolyte layer and a gel electrolyte instead of the nonaqueous electrolyte and the separator, a sodium ion secondary battery, and other secondary batteries.

Some test examples regarding the present disclosure will be described below. However, it is not intended that the present disclosure is limited to such test examples.

Example 1

As negative electrode active materials, 10 parts by mass of silicon oxide containing magnesium (Mg) and 90 parts by mass of graphite (C) were mixed. Thus, a negative electrode active material mixture of the silicon oxide containing Mg and the graphite was produced. In ion-exchange water, 100 parts by mass of the negative electrode active material mixture, 1 part by mass of styrene-butadiene rubber (SBR) as a binder, and 1 part by mass of carboxymethyl cellulose (CMC) as a thickener were mixed. Thus, a first negative electrode mixture slurry was prepared.

As negative electrode active materials, 10 parts by mass of silicon oxide containing lithium (Li) and 90 parts by mass of graphite (C) were mixed. Thus, a negative electrode active material mixture of the silicon oxide containing Li and the graphite was produced. In ion-exchange water, 100 parts by mass of the negative electrode active material mixture, 1 part by mass of styrene-butadiene rubber (SBR) as a binder, and 1 part by mass of carboxymethyl cellulose (CMC) as a thickener were mixed. Thus, a second negative electrode mixture slurry was prepared.

The first negative electrode mixture slurry was applied to both surfaces of a negative electrode current collector made of a copper foil and then dried. The resultant coating film was then extended by pressurization using a roller. Subsequently, the second negative electrode mixture slurry was applied to the dried coating film of the first negative electrode mixture slurry, and dried and extended by pressurization in the same manner as described above. Thus, a negative electrode sheet of Example 1 in which a negative electrode active material layer including a first layer made of the first negative electrode mixture slurry and a second layer made of the second negative electrode mixture slurry was supported on the negative electrode current collector was obtained. The first negative electrode mixture slurry was applied so that the ratio of the average thickness of the first layer to the average thickness of the negative electrode active material layer reached 50%.

$LiN_{1/3}Co_{1/3}Mn_{1/3}O_2$ (NCM) as a positive electrode active material, acetylene black (AB) as an electroconductive material, and polyvinylidene fluoride (PVdF) as a binder were mixed at a mass ratio of NCM:AB:PVdF=97:2:1 in N-methyl pyrrolidone (NMP). Thus, a positive electrode mixture slurry was prepared. The positive electrode mixture slurry was applied to an aluminum foil. Then, the resultant coating film was roll-pressed to have a predetermined thickness. Thus, a positive electrode sheet was produced.

As a separator, a porous polyolefin sheet having a three-layer structure of PP/PE/PE was provided. The positive electrode sheet and the negative electrode sheet were overlaid with the separator interposed therebetween, and wound to obtain a wound body. The wound body was pressed to produce a flat wound electrode assembly.

An electrode terminal was attached to the electrode assembly, which was then inserted into a case made of an aluminum laminate film and welded. Then, a nonaqueous electrolyte was introduced into the case. As the nonaqueous electrolyte, one obtained by dissolving $LiPF_6$ at a concentration of 1.0 mol/L in a solvent mixture containing ethylene carbonate (EC), dimethyl carbonate (DMC), and ethyl methyl carbonate (EMC) at a volume ratio of 3:4:3 was used. Thereafter, the laminate case was sealed. Thus, a lithium ion secondary battery of Example 1 for evaluation was obtained.

Examples 2 and 3

Lithium ion secondary batteries of Examples 2 and 3 for evaluation were produced in the same manner as in Example 1 except that the mass proportion (mass %) of the silicon oxide containing Mg in the first layer was changed as shown in Table 1.

Example 4

As negative electrode active materials, 1 part by mass of silicon oxide containing Mg, 9 parts by mass of silicon oxide containing Li, and 90 parts by mass of graphite (C) were mixed. Thus, a negative electrode active material mixture of the silicon oxide containing Mg, the silicon oxide containing Li, and the graphite was produced. In ion-exchange water, 100 parts by mass of the negative electrode active material mixture, 1 part by mass of styrene-butadiene rubber (SBR) as a binder, and 1 part by mass of carboxymethyl cellulose (CMC) as a thickener were mixed. Thus, a second negative electrode mixture slurry was prepared. Then, a lithium ion secondary battery of Example 4 for evaluation was produced in the same manner as in Example 2 except for the second negative electrode mixture slurry.

Examples 5 and 6

Lithium ion secondary batteries of Examples 5 and 6 for evaluation were produced in the same manner as in Example 4 except that the mass proportions (mass %) of the silicon oxide containing Mg and the silicon oxide containing Li in the second layer were changed as shown in Table 1.

Examples 7-9

Lithium ion secondary batteries of Examples 7 to 9 for evaluation were produced in the same manner as in Example 1 except that the first negative electrode mixture slurry was applied so that the ratio of the average thickness of the first layer to the average thickness of the negative electrode active material layer reached a value shown in Table 1.

Example 10

As negative electrode active materials, 10 parts by mass of silicon oxide containing Mg and 90 parts by mass of graphite (C) were mixed. Thus, a negative electrode active material mixture of the silicon oxide containing Mg and the graphite was produced. In ion-exchange water, 100 parts by mass of the negative electrode active material mixture, 1 part by mass of styrene-butadiene rubber (SBR) as a binder, and 1 part by mass of carboxymethyl cellulose (CMC) as a thickener were mixed. Thus, a second negative electrode mixture slurry was prepared. Then, a lithium ion secondary battery of Example 10 for evaluation was produced in the same manner as in Example 1 except for the second negative electrode mixture slurry.

Example 11

10 parts by mass of silicon oxide containing Li and 90 parts by mass of graphite (C) were mixed. Thus, a negative electrode active material mixture of the silicon oxide containing Li and the graphite was produced. In ion-exchange water, 100 parts by mass of the negative electrode active material mixture, 1 part by mass of styrene-butadiene rubber (SBR) as a binder, and 1 part by mass of carboxymethyl cellulose (CMC) as a thickener were mixed. Thus, a first negative electrode mixture slurry was prepared. Then, a lithium ion secondary battery of Example 11 for evaluation was produced in the same manner as in Example 1 except for the first negative electrode mixture slurry.

<Activation of Lithium Ion Secondary Battery for Evaluation>

The produced lithium ion secondary batteries of Examples 1 to 11 for evaluation were placed in an environment at 25° C. For activation (initial charging), as the constant current constant voltage method, each lithium ion secondary battery for evaluation was subjected to constant current charging to 4.1 V at a current value of ⅓C and then subjected to constant voltage charging until the current value reached 1/50C. Thus, the lithium ion secondary battery was fully charged. Thereafter, the lithium ion secondary battery for evaluation was subjected to constant current discharging to 3.0 V at a current value of ⅓C.

<Measurement of Capacity Retention Rate>

The activated lithium ion secondary battery for evaluation was placed in an environment at 25° C. Then, charging and discharging of performing constant current charging to 4.1 V at a current value of 0.5 C and constant current discharging to 3.0 V at a current value of 0.5 C as one cycle was repeated for 500 cycles. The discharge capacities of the 1st and 500th cycles were measured, and the ratio of the discharge capacity of the 500th cycle to the discharge capacity of the 1st cycle was calculated as the capacity retention rate (%). At this time, the capacity retention rate of 90% or more was evaluated as "A"; that of 80% or more and less than 90% was evaluated as "B"; and that of less than 80% was evaluated as "C." The results are shown in Table 1. If the capacity retention rate after the 500 cycles is good, the cycle life of the secondary battery can be evaluated as high.

<Measurement of Battery Resistance>

Each of the activated lithium ion secondary batteries for evaluation was adjusted to SOC 50%. Then, the lithium ion secondary battery was placed still in an environment at 25° C. Thereafter, the lithium ion secondary battery was subjected to constant current discharging for 10 seconds at a current value of 5 C. At this time, a voltage drop $\Delta V$ was obtained, and $\Delta V$ was divided by the current value (5 C). Thus, a battery resistance was calculated. Assuming that the resistance of the lithium ion secondary battery of Example 11 for evaluation is 100%, the resistance of less than 110% was evaluated as "A"; that of 110% or more and less than 120% was evaluated as "B"; and that of 120% or more was evaluated as "C." The results are shown in Table 1. When the battery resistance is good, it can be evaluated as high output.

TABLE 1

| | Second Layer | | | First Layer | | | | |
|---|---|---|---|---|---|---|---|---|
| | Mass Proportion (mass %) of Silicon Oxide containing Mg | Mass Proportion (mass %) of Silicon Oxide containing Li | Thickness (%) | Mass Proportion (mass %) of Silicon Oxide containing Mg | Mass Proportion (mass %) of Silicon Oxide containing Li | Thickness (%) | Capacity Retention Rate | Battery Resistance |
| Ex. 1 | 0 | 10 | 50 | 10 | 0 | 50 | A | A |
| Ex. 2 | 0 | 10 | 50 | 20 | 0 | 50 | A | A |
| Ex. 3 | 0 | 10 | 50 | 2 | 0 | 50 | A | A |
| Ex. 4 | 1 | 9 | 50 | 10 | 0 | 50 | A | A |

TABLE 1-continued

| | Second Layer | | | First Layer | | | | |
|---|---|---|---|---|---|---|---|---|
| | Mass Proportion (mass %) of Silicon Oxide containing Mg | Mass Proportion (mass %) of Silicon Oxide containing Li | Thickness (%) | Mass Proportion (mass %) of Silicon Oxide containing Mg | Mass Proportion (mass %) of Silicon Oxide containing Li | Thickness (%) | Capacity Retention Rate | Battery Resistance |
| Ex. 5 | 2 | 8 | 50 | 10 | 0 | 50 | A | B |
| Ex. 6 | 3 | 7 | 50 | 10 | 0 | 50 | A | C |
| Ex. 7 | 0 | 10 | 80 | 10 | 0 | 20 | A | A |
| Ex. 8 | 0 | 10 | 30 | 10 | 0 | 70 | A | A |
| Ex. 9 | 0 | 10 | 20 | 10 | 0 | 80 | A | B |
| Ex. 10 | 10 | 0 | 50 | 10 | 0 | 50 | A | C |
| Ex. 11 | 0 | 10 | 50 | 0 | 10 | 50 | C | A |

As can be seen from Table 1, when the negative electrode active material layer contains silicon oxide containing at least one alkali earth metal, the amount of the alkali earth metal in the first layer is higher than the amount of the alkali earth metal in the second layer, and 2 mass % or less of the silicon oxide containing an alkali earth metal is contained in the second layer relative to 100 mass % of the negative electrode active material in the second layer, the evaluation results of the capacity retention rate and the battery resistance are both good ("A" or "B"). When 1 mass % or less of the silicon oxide containing an alkali earth metal is contained in the second layer relative to 100 mass % of the negative electrode active material in the second layer, the evaluation results of the capacity retention rate and the battery resistance are particularly good. When the ratio of the average thickness of the first layer to the average thickness of the negative electrode active material layer is 20% or more and 70% or less, the capacity retention rate and the battery resistance are particularly good.

In contrast, in Examples 6 and 10 where 3 mass % or more of the silicon oxide containing an alkali earth metal is contained in the second layer relative to 100 mass % of the negative electrode active material in the second layer, the result of the evaluation of the battery resistance is "C." Further, in Example 11 where the negative electrode active material layer contains only silicon oxide containing an alkali metal, the evaluation result of the capacity retention rate is "C."

Example 12

As negative electrode active materials, 1 part by mass of silicon oxide containing Mg, 9 parts by mass of silicon oxide containing Li, and 90 parts by mass of graphite (C) were mixed. Thus, a negative electrode active material mixture of the silicon oxide containing Mg, the silicon oxide containing Li, and the graphite was produced. In ion-exchange water, 100 parts by mass of the negative electrode active material mixture, 1 part by mass of styrene-butadiene rubber (SBR) as a binder, and 1 part by mass of carboxymethyl cellulose (CMC) as a thickener were mixed. Thus, a first negative electrode mixture slurry was prepared. Then, a lithium ion secondary battery of Example 12 for evaluation was produced in the same manner as in Example 1 except for the first negative electrode mixture slurry.

Examples 13 and 14

Lithium ion secondary batteries of Examples 13 and 14 for evaluation were produced in the same manner as in Example 12 except that the mass proportions (mass %) of the silicon oxide containing Mg and the silicon oxide containing Li contained in the first and second layers were changed as shown in Table 2.

Example 15

As negative electrode active materials, 10 parts by mass of silicon oxide containing Li and 90 parts by mass of graphite (C) were mixed. Thus, a negative electrode active material mixture of the silicon oxide containing Li and the graphite was produced. In ion-exchange water, 100 parts by mass of the negative electrode active material mixture, 1 part by mass of styrene-butadiene rubber (SBR) as a binder, and 1 part by mass of carboxymethyl cellulose (CMC) as a thickener were mixed. Thus, a first negative electrode mixture slurry was prepared.

As negative electrode active materials, 10 parts by mass of silicon oxide containing Mg and 90 parts by mass of graphite (C) were mixed. Thus, a negative electrode active material mixture of the silicon oxide containing Mg and the graphite was produced. In ion-exchange water, 100 parts by mass of the negative electrode active material mixture, 1 part by mass of styrene-butadiene rubber (SBR) as a binder, and 1 part by mass of carboxymethyl cellulose (CMC) as a thickener were mixed. Thus, a second negative electrode mixture slurry was prepared.

Then, a lithium ion secondary battery of Example 15 for evaluation was produced in the same manner as in Example 1 except that the first negative electrode mixture slurry and the second negative electrode mixture slurry produced above were used.

The produced lithium ion secondary batteries of Examples 12 to 15 for evaluation were activated (initial-charged) in the same manner as mentioned above. Each activated lithium ion secondary battery for evaluation was subjected to the capacity retention rate measurement and the battery resistance measurement in the same manner as mentioned above. At this time, the capacity retention rate of 90% or more was evaluated as "A"; that of 80% or more and less than 90% was evaluated as "B"; and that of less than 80% was evaluated as "C." The results are shown in Table 2. Assuming that the resistance of the lithium ion secondary battery of Example 11 for evaluation is 100%, the resistance of less than 110% was evaluated as "A"; that of 110% or more and less than 120% was evaluated as "B"; and that of 120% or more was evaluated as "C." The results are shown in Table 2.

TABLE 2

| | Second Layer | | | First Layer | | | | |
|---|---|---|---|---|---|---|---|---|
| | Mass Proportion (mass %) of Silicon Oxide containing Mg | Mass Proportion (mass %) of Silicon Oxide containing Li | Thickness (%) | Mass Proportion (mass %) of Silicon Oxide containing Mg | Mass Proportion (mass %) of Silicon Oxide containing Li | Thickness (%) | Capacity Retention Rate | Battery Resistance |
| Ex. 12 | 0 | 10 | 50 | 1 | 9 | 50 | B | A |
| Ex. 13 | 1 | 9 | 50 | 2 | 8 | 50 | A | A |
| Ex. 14 | 2 | 8 | 50 | 1 | 9 | 50 | B | B |
| Ex. 15 | 10 | 0 | 50 | 0 | 10 | 50 | A | C |

As can be seen from Table 2, even in the case where the first layer contains silicon oxide containing an alkali metal, when the negative electrode active material layer contains silicon oxide containing at least one alkali earth metal, the amount of the alkali earth metal in the first layer is higher than the amount of the alkali earth metal in the second layer, and 2 mass % or less of the silicon oxide containing an alkali earth metal is contained in the second layer, relative to 100 mass % of the negative electrode active material in the second layer, the evaluation results of the capacity retention rate and the battery resistance are good ("A" or "B").

Example 21

As negative electrode active materials, 10 parts by mass of silicon oxide containing Ca and 90 parts by mass of graphite (C) were mixed. Thus, a negative electrode active material mixture of the silicon oxide containing Ca and the graphite was produced. In ion-exchange water, 100 parts by mass of the negative electrode active material mixture, 1 part by mass of styrene-butadiene rubber (SBR) as a binder, and 1 part by mass of carboxymethyl cellulose as a thickener were mixed. Thus, a first negative electrode mixture slurry was prepared.

As negative electrode active materials, 10 parts by mass of silicon oxide containing Li and 90 parts by mass of graphite (C) were mixed. Thus, a negative electrode active material mixture of the silicon oxide containing Li and the graphite was produced. In ion-exchange water, 100 parts by mass of the negative electrode active material mixture, 1 part by mass of styrene-butadiene rubber (SBR) as a binder, and 1 part by mass of carboxymethyl cellulose (CMC) as a thickener were mixed. Thus, a second negative electrode mixture slurry was prepared.

The first negative electrode mixture slurry was applied to both surfaces of a negative electrode current collector made of a copper foil and then dried. The resultant coating film was then extended by pressurization using a roller. Subsequently, the second negative electrode mixture slurry was applied to the dried coating film of the first negative electrode mixture slurry, in the same manner as described above, dried, and pressed by a rolling roller. Thus, a negative electrode sheet of Example 21 in which the negative electrode active material layer including a first layer made of the first negative electrode mixture slurry and a second layer made of the second negative electrode mixture slurry was supported on the negative electrode current collector was obtained. The first negative electrode mixture slurry was applied so that the ratio of the average thickness of the first layer to the average thickness of the negative electrode active material layer reached 50%. A lithium ion secondary battery of Example 21 for evaluation was produced in the same manner as in Example 1 except for the negative electrode sheet.

Examples 22 and 23

Lithium ion secondary batteries of Examples 22 and 23 for evaluation were produced in the same manner as in Example 21 except that the mass proportion of the silicon oxide containing an alkali earth metal in the first layer was changed as shown in Table 3.

Example 24

As negative electrode active materials, 10 parts by mass of silicon oxide containing Li and 90 parts by mass of graphite (C) were mixed. Thus, a negative electrode active material mixture of the silicon oxide containing Li and the graphite was produced. In ion-exchange water, 100 parts by mass of the negative electrode active material mixture, 1 part by mass of styrene-butadiene rubber (SBR) as a binder, and 1 part by mass of carboxymethyl cellulose (CMC) as a thickener were mixed. Thus, a first negative electrode mixture slurry was prepared.

As negative electrode active materials, 10 parts by mass of silicon oxide containing Ca and 90 parts by mass of graphite (C) were mixed. Thus, a negative electrode active material mixture of the silicon oxide containing Ca and the graphite was produced. In ion-exchange water, 100 parts by mass of the negative electrode active material mixture, 1 part by mass of styrene-butadiene rubber (SBR) as a binder, and 1 part by mass of carboxymethyl cellulose as a thickener were mixed. Thus, a second negative electrode mixture slurry was prepared. A lithium ion secondary battery of Examples 24 for evaluation was produced in the same manner as in Example 21 except for this.

The produced lithium ion secondary batteries of Examples 21 to 24 and Reference Example for evaluation were activated (initial-charged) in the same manner as mentioned above. Each activated lithium ion secondary battery for evaluation was subjected to the capacity retention rate measurement and the battery resistance measurement in the same manner as mentioned above. At this time, the capacity retention rate of 90% or more was evaluated as "A"; that of 80% or more and less than 90% was evaluated as "B"; and that of less than 80% was evaluated as "C." The results are shown in Table 3. Assuming that the resistance of the lithium ion secondary battery of Example 11 for evaluation is 100%, the resistance of less than 110% was evaluated as "A"; that of 110% or more and less than 120% was evaluated as "B"; and that of 120% or more was evaluated as "C." The results are shown in Table 3.

TABLE 3

| | Second Layer | | | First Layer | | | | |
|---|---|---|---|---|---|---|---|---|
| | Mass Proportion (mass %) of Silicon Oxide containing Ca | Mass Proportion (mass %) of Silicon Oxide containing Li | Thickness (%) | Mass Proportion (mass %) of Silicon Oxide containing Ca | Mass Proportion (mass %) of Silicon Oxide containing Li | Thickness (%) | Capacity Retention Rate | Battery Resistance |
| Ex. 21 | 0 | 10 | 50 | 10 | 0 | 50 | A | A |
| Ex. 22 | 0 | 10 | 50 | 20 | 0 | 50 | A | A |
| Ex. 23 | 0 | 10 | 50 | 2 | 0 | 50 | A | A |
| Ex. 24 | 10 | 0 | 50 | 0 | 10 | 50 | A | C |

As can be seen from Table 3, even when the type of the silicon oxide containing an alkali earth metal is changed, the same tendency as in Examples 1 to 3 shown in Table 1 was shown. Accordingly, regardless of the type of the silicon oxide containing an alkali earth metal, it is possible to provide a negative electrode which achieves both improvement in the cycle life and an increase in the output of the secondary battery.

Although specific examples of the present disclosure have been described in detail above, they are mere examples and do not limit the appended claims. The technology described in the appended claims include various modifications and changes of the foregoing specific examples.

What is claimed is:

1. A secondary battery negative electrode, comprising:

a negative electrode current collector; and a negative electrode active material layer formed on a surface of the negative electrode current collector, wherein the negative electrode active material layer contains silicon oxide containing at least one alkali earth metal, and silicon oxide containing at least one alkali metal, the negative electrode active material layer includes at least a first layer and a second layer, the first layer is disposed between the second layer and the negative electrode current collector, the second layer contains 2 mass % or less of the silicon oxide containing the alkali earth metal, relative to 100 mass % of negative electrode active material in the second layer, an amount of the alkali earth metal in the first layer calculated based on energy dispersive X-ray spectroscopy using a scanning electron microscope image is higher than an amount of the alkali earth metal in the second layer, an amount of the alkali metal in the first layer calculated based on the energy dispersive X-ray spectroscopy using the scanning electron microscope image is lower than an amount of the alkali metal in the second layer, the first layer contains the silicon oxide containing the alkali earth metal and does not contain the silicon oxide containing the alkali metal, and the second layer contains both the silicon oxide containing the alkali earth metal and the silicon oxide containing the alkali metal.

2. A secondary battery negative electrode, comprising:

a negative electrode current collector; and a negative electrode active material layer formed on a surface of the negative electrode current collector, wherein the negative electrode active material layer contains silicon oxide containing at least one alkali earth metal, and silicon oxide containing at least one alkali metal, the negative electrode active material layer includes at least a first layer and a second layer, the first layer is disposed between the second layer and the negative electrode current collector, the second layer contains 2 mass % or less of the silicon oxide containing the alkali earth metal, relative to 100 mass % of negative electrode active material in the second layer, an amount of the alkali earth metal in the first layer calculated based on energy dispersive X-ray spectroscopy using a scanning electron microscope image is higher than an amount of the alkali earth metal in the second layer, an amount of the alkali metal in the first layer calculated based on the energy dispersive X-ray spectroscopy using the scanning electron microscope image is lower than an amount of the alkali metal in the second layer, the first layer contains the silicon oxide containing the alkali earth metal and does not contain the silicon oxide containing the alkali metal, and the second layer contains the silicon oxide containing the alkali metal and does not contain the silicon oxide containing the alkali earth metal.

3. A secondary battery negative electrode, comprising:

a negative electrode current collector; and a negative electrode active material layer formed on a surface of the negative electrode current collector, wherein the negative electrode active material layer contains silicon oxide containing at least one alkali earth metal, and silicon oxide containing at least one alkali metal, the negative electrode active material layer includes at least a first layer and a second layer, the first layer is disposed between the second layer and the negative electrode current collector, the second layer contains 2 mass % or less of the silicon oxide containing the alkali earth metal, relative to 100 mass % of negative electrode active material in the second layer, an amount of the alkali earth metal in the first layer calculated based on energy dispersive X-ray spectroscopy using a scanning electron microscope image is higher than an amount of the alkali earth metal in the second layer, an amount of the alkali metal in the first layer calculated based on the energy dispersive X-ray spectroscopy using the scanning electron microscope image is lower than an amount of the alkali metal in the second layer, the first layer contains both the silicon oxide containing the alkali metal and the silicon oxide containing the alkali earth metal, and the second layer contains the silicon oxide containing the alkali metal and does not contain the silicon oxide containing the alkali earth metal.

4. A secondary battery negative electrode, comprising:

a negative electrode current collector; and a negative electrode active material layer formed on a surface of the negative electrode current collector, wherein the negative electrode active material layer contains silicon oxide containing at least one alkali earth metal, and silicon oxide containing at least one alkali metal, the negative electrode active material layer includes at least a first layer and a second layer, the first layer is disposed between the second layer and the negative electrode current collector, the second layer contains 2 mass % or less of the silicon oxide containing the alkali earth metal, relative to 100 mass % of negative electrode active material in the second layer, an amount of the alkali earth metal in the first layer calculated based on energy dispersive X-ray spectroscopy using a scanning electron microscope image is higher than an amount of the alkali earth metal in the second layer, an amount of the alkali metal in the first layer calculated based on the energy dispersive X-ray spectroscopy using the scanning electron microscope image is lower than an amount of the alkali metal in the second layer, and a total amount of the silicon oxide containing the alkali earth metal and/or the silicon oxide containing the alkali metal contained in the first layer is the same as a total amount of the silicon oxide containing the alkali earth metal and/or the silicon oxide containing the alkali metal contained in the second layer.

5. A secondary battery negative electrode comprising:

a negative electrode current collector; and a negative electrode active material layer formed on a surface of the negative electrode current collector, wherein the negative electrode active material layer contains silicon oxide containing at least one alkali earth metal, the negative electrode active material layer includes at least a first layer and a second layer, the second layer contains silicon oxide containing at least one alkali metal, an amount of the silicon oxide containing the alkali earth metal contained in the first layer is 2 mass % to 20 mass %, relative to 100 mass % of negative electrode active material in the first layer, the first layer is disposed between the second layer and the negative electrode current collector, the second layer contains 2 mass % or less of the silicon oxide containing the alkali earth metal, relative to 100 mass % of negative electrode active material in the second layer, and an amount of the alkali earth metal in the first layer calculated based on energy dispersive X-ray spectroscopy using a scanning electron microscope image is higher than an amount of the alkali earth metal in the second layer, and an amount of the silicon oxide containing the alkali metal contained in the second layer is more than 0 mass % and 10 mass % or less, relative to 100 mass % of the negative electrode active material in the second layer.

6. The secondary battery negative electrode according to claim 5, wherein both the first layer and the second layer contain the silicon oxide containing the alkali earth metal and the silicon oxide containing the alkali metal.

7. The secondary battery negative electrode according to claim 5, wherein the first layer contains the silicon oxide containing the alkali earth metal and does not contain the silicon oxide containing the alkali metal, and the second layer contains both the silicon oxide containing the alkali metal and the silicon oxide containing the alkali metal.

8. The secondary battery negative electrode according to claim 5, wherein the first layer contains the silicon oxide containing the alkali earth metal and does not contain the silicon oxide containing the alkali metal, and the second layer contains the silicon oxide containing the alkali metal and does not contain the silicon oxide containing the alkali earth metal.

9. The secondary battery negative electrode according to claim 5, wherein the first layer contains both the silicon oxide containing the alkali metal and the silicon oxide containing the alkali earth metal, and the second layer contains the silicon oxide containing the alkali metal and does not contain the silicon oxide containing the alkali earth metal.

10. The secondary battery negative electrode according to claim 5, wherein a total amount of the silicon oxide containing the alkali earth metal and/or the silicon oxide containing the alkali metal contained in the first layer is the same as a total amount of the silicon oxide containing the alkali earth metal and/or the silicon oxide containing the alkali metal contained in the second layer.

11. The secondary battery negative electrode according to claim 5, wherein the silicon oxide containing the alkali earth metal includes silicon oxide containing magnesium and/or silicon oxide containing calcium.

12. The secondary battery negative electrode according to claim 5, wherein the silicon oxide containing the alkali metal includes silicon oxide containing lithium.

* * * * *